(12) United States Patent
Takita et al.

(10) Patent No.: US 7,916,967 B2
(45) Date of Patent: Mar. 29, 2011

(54) IMAGE PROCESSING APPARATUS AND IMAGE PROCESSING METHOD

(75) Inventors: Kenji Takita, Osaka (JP); Satoshi Kondo, Kyoto (JP); Yusuke Monobe, Kyoto (JP); Yasuhiro Kuwahara, Osaka (JP)

(73) Assignee: Panasonic Corporation, Osaka (JP)

( * ) Notice: Subject to any disclaimer, the term of this patent is extended or adjusted under 35 U.S.C. 154(b) by 921 days.

(21) Appl. No.: 11/826,938

(22) Filed: Jul. 19, 2007

(65) Prior Publication Data

US 2008/0019600 A1 Jan. 24, 2008

(30) Foreign Application Priority Data

Jul. 20, 2006 (JP) ................................. 2006-197893

(51) Int. Cl.
G06K 9/40 (2006.01)
H04N 1/40 (2006.01)
(52) U.S. Cl. ...................... 382/274; 382/264; 358/3.03
(58) Field of Classification Search ................. 382/274, 382/264; 345/3.03
See application file for complete search history.

(56) References Cited

U.S. PATENT DOCUMENTS

| | | | | |
|---|---|---|---|---|
| 4,532,596 A | * | 7/1985 | Pugsley | 700/125 |
| 5,790,704 A | * | 8/1998 | Rao et al. | 382/237 |
| 5,956,432 A | * | 9/1999 | Ohta | 382/264 |
| 5,960,122 A | * | 9/1999 | Morikawa | 382/274 |
| 6,055,340 A | * | 4/2000 | Nagao | 382/261 |
| 2001/0021041 A1 | * | 9/2001 | Suzuki | 358/458 |
| 2003/0151773 A1 | * | 8/2003 | Ogawa et al. | 358/3.03 |
| 2003/0231348 A1 | * | 12/2003 | Ishii et al. | 358/3.03 |
| 2006/0028485 A1 | * | 2/2006 | Yoshida et al. | 345/600 |

FOREIGN PATENT DOCUMENTS

| | | |
|---|---|---|
| JP | 6-203148 | 7/1994 |
| JP | 10-191332 | 7/1998 |
| JP | 2004-336478 | 11/2004 |

* cited by examiner

*Primary Examiner* — Hadi Akhavannik
(74) *Attorney, Agent, or Firm* — Wenderoth, Lind & Ponack, LLP.

(57) ABSTRACT

The prevent invention can prevent roughness in an image and reduce contouring and coding distortion in the image. The image processing apparatus according to the present invention reduces distortion in an input image, and includes: a masking signal generating unit 101 that generates a masking signal for reducing the distortion; and a masking signal adding unit 102 that adds the masking signal to the input image, wherein the masking signal generating unit 101 includes: a level difference processing unit 105 that smoothes a level difference between pixel values of pixels in the input image; a difference calculating unit 106 that calculates a difference between the input image and an image which has been processed by the level difference processing unit 105; and a random number setting unit 108 that sets an amplitude, creates a is random number having the set amplitude, the amplitude decreasing, as the difference approaches a predetermined value.

14 Claims, 18 Drawing Sheets

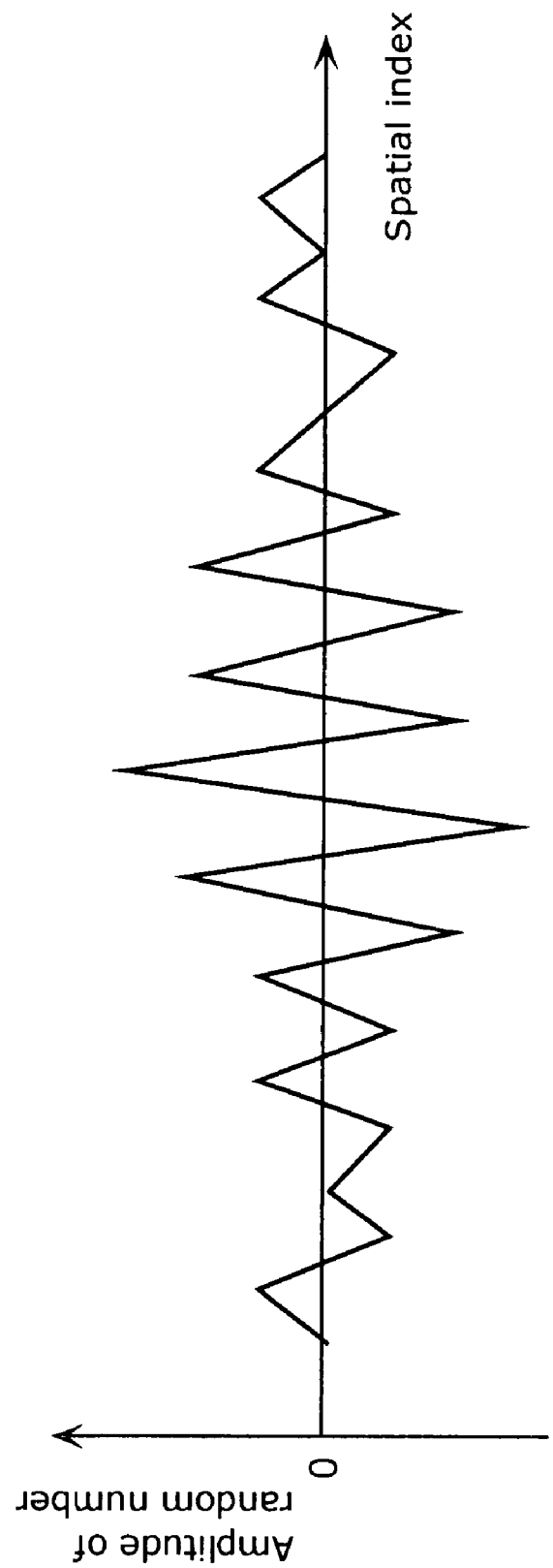

FIG. 3B

| Level difference \ Distance | -4 | -3 | -2 | -1 | 0 | +1 | +2 | +3 | +4 | +5 |
|---|---|---|---|---|---|---|---|---|---|---|
| 1 | -0.1 | -0.15 | -0.25 | -0.35 | 0.5 | 0.35 | 0.25 | 0.15 | 0.1 | 0.05 |
| 2 | -0.2 | -0.3 | -0.5 | -0.7 | 1 | 0.7 | 0.5 | 0.3 | 0.2 | 0.1 |
| 3 | -0.3 | -0.45 | -0.75 | -1.05 | 1.5 | 1.05 | 0.75 | 0.45 | 0.3 | 0.15 |
| ---- | ---- | ---- | ---- | ---- | ---- | ---- | ---- | ---- | ---- | ---- |

IMAGE PROCESSING APPARATUS AND IMAGE PROCESSING METHOD

BACKGROUND OF THE INVENTION (1) Field of the Invention

The present invention relates to an image processing apparatus and an image processing method for reducing contouring and coding distortion in a digital image signal.

(2) Description of the Related Art

Since a quantization error occurs in the processing using a digital signal, there are cases where distortion occurs in an output signal even when the input signal varies smoothly. The distortion is viewed as contouring on an image, and degrades the image quality. In particular, when gradation conversion processing that performs contrast enhancement on an image is performed, there are cases where image quality degradation due to the quantization error becomes a serious problem.

Furthermore, an image which is compressed using the Moving Picture Expert Group (MPEG) standard is obtained by quantizing a Discrete Cosine Transform (DCT) coefficient that is obtained by calculating a luminance signal of the image on a block basis. Thus, when the DCT coefficient is roughly quantized, there are cases where subjective picture quality is degraded due to the occurrence of block distortion.

For reducing the contouring or block distortion in the aforementioned image, a technique for adding a random number signal to the image is known. The adding of random numbers provides the following three advantages.

First, it becomes difficult to perceive a quantization error due to a masking effect produced by adding random numbers (for example, Japanese Unexamined Patent Application Publication No. 2004-336478).

Second, it is possible to represent a half-tone image by controlling an expected value of random numbers to be added.

For example, when adding either 1 or 0 to a pixel with a luminance of 50 with a 50/50 probability, the resulting value is statistically equivalent to a half-tone value with a luminance of 50.5 that is obtained by calculating the space average and temporal average. Japanese Unexamined Patent Application Publication No. 10-191332 discloses a technique of statistically representing gradation with fractional precision by controlling the probability distribution of created random numbers, even when a luminance difference between blocks where the detected distortion occurs is 1.

Third, when a difference between quantization steps for gradation in a display apparatus is not constant and there are level difference variations between the steps, it is possible to reduce the level difference and make the difference constant in each quantization step by adding a random number equal to or larger than one bit (a multi-bit random number) (for example, Japanese Unexamined Patent Application Publication No. 6-203148). With this, it is possible to reduce the contouring which is obvious when a difference in the quantization steps for gradation in a display apparatus is not constant.

SUMMARY OF THE INVENTION

However, the aforementioned techniques have the following problem. In order to make the contouring or block distortion less obvious by adding random numbers, it is necessary to add the random numbers having a sufficient amplitude. By uniformly adding the random numbers to an entire image, there is a problem that the displayed image becomes rough and the subjective picture quality is degraded.

The present invention has been conceived in view of the aforementioned problem, and the object of the present invention is to provide an image processing apparatus and an image processing method for reducing contouring and coding distortion in an image, as well as to prevent roughness in an image.

In order to solve the aforementioned problem, the image processing apparatus according to the present invention is an image processing apparatus that reduces distortion in an input image, the apparatus includes: a masking signal generating unit that generates a masking signal for reducing the distortion; and a masking signal adding unit that adds the masking signal to the input image, wherein the masking signal generating unit includes: a level difference processing unit that smoothes a level difference between pixel values of pixels in the input image; a difference calculating unit that calculates a difference between the input image and an image which has been processed by the level difference processing unit; and a random number setting unit that sets an amplitude, creates a random number having the set amplitude, and generates, as the masking signal, a signal based on the created random number, the amplitude decreasing, as the difference approaches a predetermined value.

With this, it is possible to add a random number particularly in a portion where a level difference between pixel values occurs, and to reduce contouring and coding distortion in an image by the masking effect of adding a random number. Furthermore, in a portion where the level difference does not occur, it is possible to prevent a random number from being added and to prevent roughness in an image.

Furthermore, it is possible that the random number setting unit sets an expected value of the random number based on the difference calculated by the difference calculating unit, and creates the random number having the set expected value and the set amplitude. With this, it is possible to visually smooth a level difference of luminance by controlling an expected value of a masking signal, and to further reduce the contouring or block distortion.

Furthermore, it is possible that the level difference processing unit smoothes the level difference by processing the input image using a low-pass filter. With this, it is possible to easily smooth the level difference between pixel values.

Furthermore, it is possible that the level difference processing unit smoothes the level difference by processing the input image using an epsilon filter. With this, it is possible to smooth a level difference which is required to be smoothed, and to prevent image blurring without processing a level difference which is not required to be smoothed, such as an edge component on an image.

Furthermore, it is possible that the level difference processing unit calculates the level difference between the pixel values of the pixels, and replaces processing target pixels with virtual pixels, the processing target pixels including level difference pixels, the virtual pixels being calculated based on a distance between the level difference pixels and the processing target pixels and based on the level difference between the pixel values so as to smooth the level difference, the level difference pixels causing the level difference. With this, it is possible to directly calculate a difference between an input image and an image after the level difference processing, and to reduce an amount to be processed.

Furthermore, it is possible that the masking signal generating unit further includes a gradation conversion unit that outputs a converted difference by converting gradation of the difference, such that an absolute value of the converted difference is equal to or less than a first threshold value, and the random number setting unit sets an amplitude, and creates a random number having the set amplitude, the amplitude decreasing, as the converted difference approaches a predetermined value. With this, it is possible to prevent a masking signal having an unnecessarily large amplitude from being added to an level difference which does not cause contouring, in other words, from being added to a level difference indicating an edge component on an image.

Furthermore, it is possible that the random number setting unit sets an amplitude, and creates a random number having the set amplitude, the amplitude decreasing, as an absolute value of the converted difference decreases. With this, it is possible to prevent roughness in an input image without adding a random number to a portion in which there is no level difference between pixel values of the input image.

Furthermore, it is possible that the pixel values are integers, and the random number setting unit sets an expected value of the random number based on the converted difference, sets an amplitude, and creates a random number having the set expected value and the set amplitude, the amplitude decreasing, as the converted difference approaches an integer value. With this, it is possible to represent a pixel value indicating an integer without adding a random number.

Furthermore, it is possible that the gradation conversion unit outputs 0 as the converted difference, when the absolute value of the difference is larger than a second threshold value. With this, it is possible to prevent a masking signal from being added to the level difference indicating an edge component of an image.

Furthermore, it is possible that the gradation conversion unit outputs, as the converted difference, a value obtained by decreasing the absolute value of the difference at a fixed ratio. With this, it is possible to maintain a level difference to a certain extent after adding a masking signal by limiting the degree of smoothing a level difference, and thus to prevent image blurring.

Furthermore, it is possible that the masking signal generating unit further includes a visual characteristic analyzing unit that calculates a visual characteristic analytical parameter by analyzing a human visual characteristic of the input image, and the random number setting unit sets, based on the visual characteristic analytical parameter, the amplitude so that the masking signal is added only to a portion in which the distortion in the input image is obvious, and creates the random number having the set amplitude. With this, it is possible to add a masking signal only in a portion where contouring tends to visually and easily occurs, when a person views the image, and thus to efficiently prevent occurrence of the contouring.

Furthermore, it is possible that the visual characteristic analyzing unit includes a spatial activity analyzing unit that analyzes a spatial activity of the input image, and the random number setting unit sets the amplitude so that the amplitude decreases in a portion in which the spatial activity is high. Alternatively, it is possible that the visual characteristic analyzing unit includes a motion amount analyzing unit that analyzes a motion amount of the input image, and the random number setting unit sets the amplitude so that the amplitude increases in a portion in which the motion amount is small.

According to the image processing apparatus and the image processing method of the present invention, by controlling the intensity of the masking signal which is added to an image depending on the level difference between images having different luminance, it is possible to intensify a masking signal in a portion where there is a level difference between images having different luminance and to weaken the masking signal in a flat portion where there is no level difference between such images. Thus, it is possible to improve subjective picture quality, while reducing contouring or block distortion without increasing unnecessary noise.

FURTHER INFORMATION ABOUT TECHNICAL BACKGROUND TO THIS APPLICATION

The disclosure of Japanese Patent Application No. 2006-197893 filed on Jul. 20, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2B shows an example of random numbers added to the original image.

FIG. 3B shows a table for calculating virtual pixels.

DESCRIPTION OF THE PREFERRED EMBODIMENTS

The embodiments of the present invention will be described with reference to the diagrams hereinafter.

First Embodiment

Figure 1:
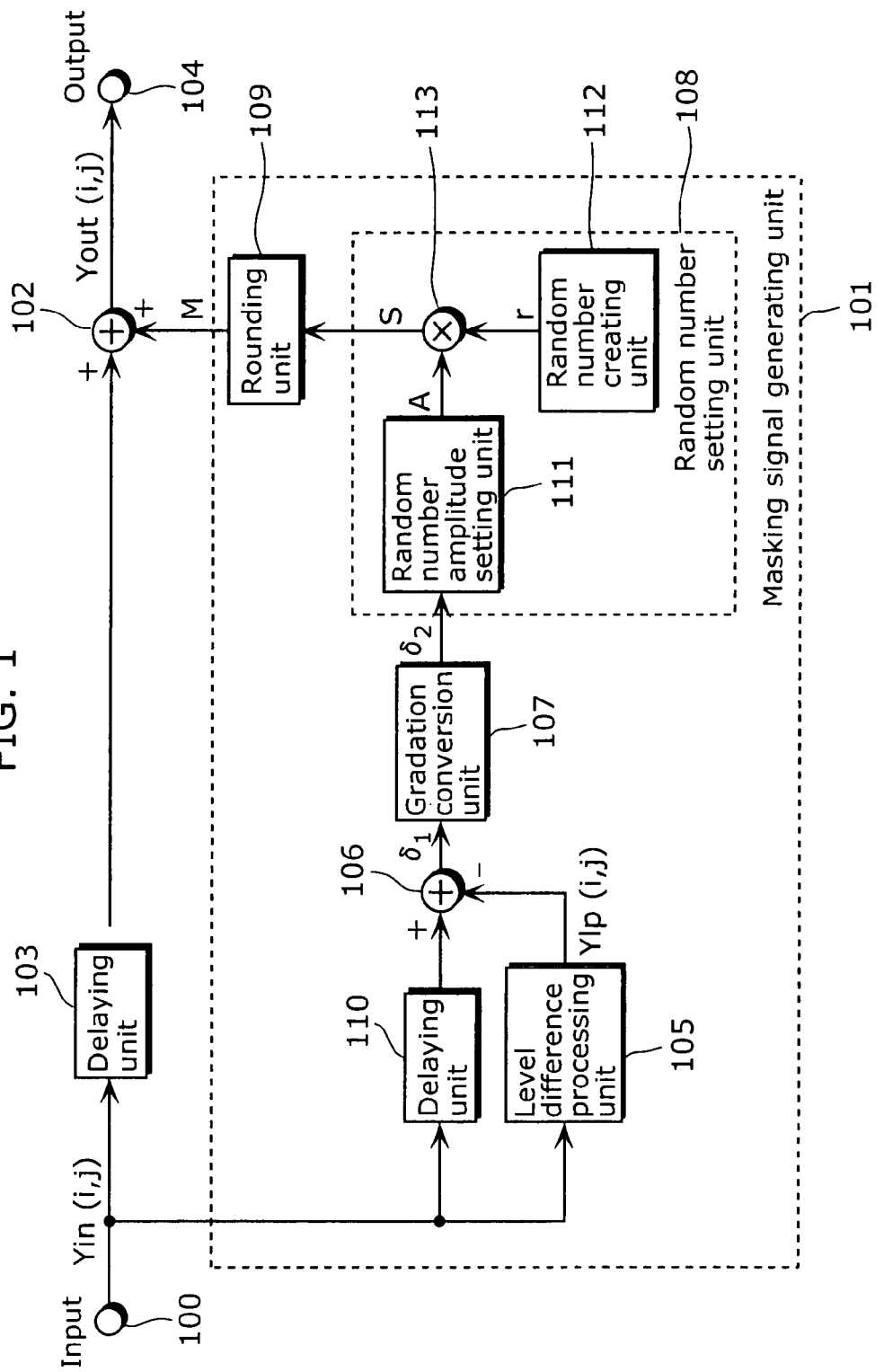
FIG. 1 schematically shows an image processing apparatus according to the first embodiment of the present invention.

FIG. 1 schematically shows an embodiment of an image processing apparatus and an image processing method of the present invention. The image processing apparatus shown in the diagram is an apparatus which adds a masking signal including a random number to an image signal of an input image, and includes an input unit 100, a masking signal generating unit 101, a masking signal adding unit 102, a delaying unit 103, and an output unit 104.

Figure 2A:
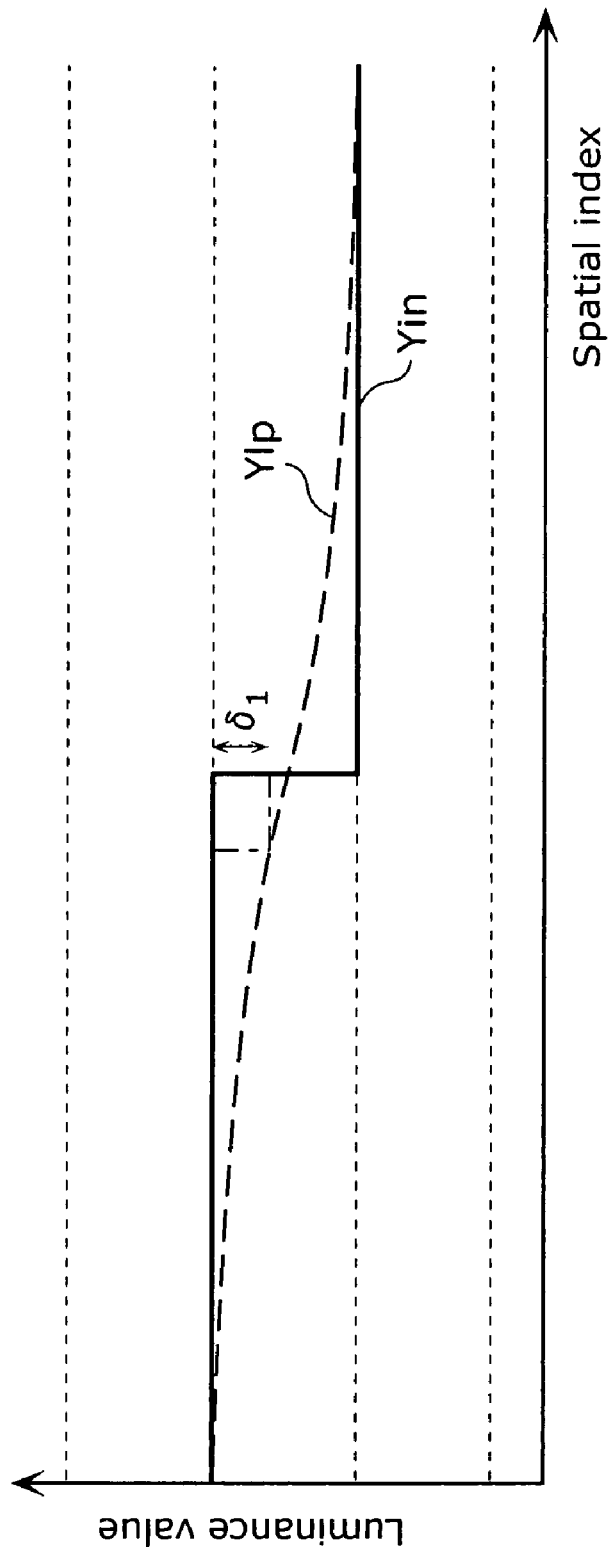
FIG. 2A shows an example of a difference $\delta_1$ between an original image and an image which has been processed using a low pass filter.
Figure 2C:
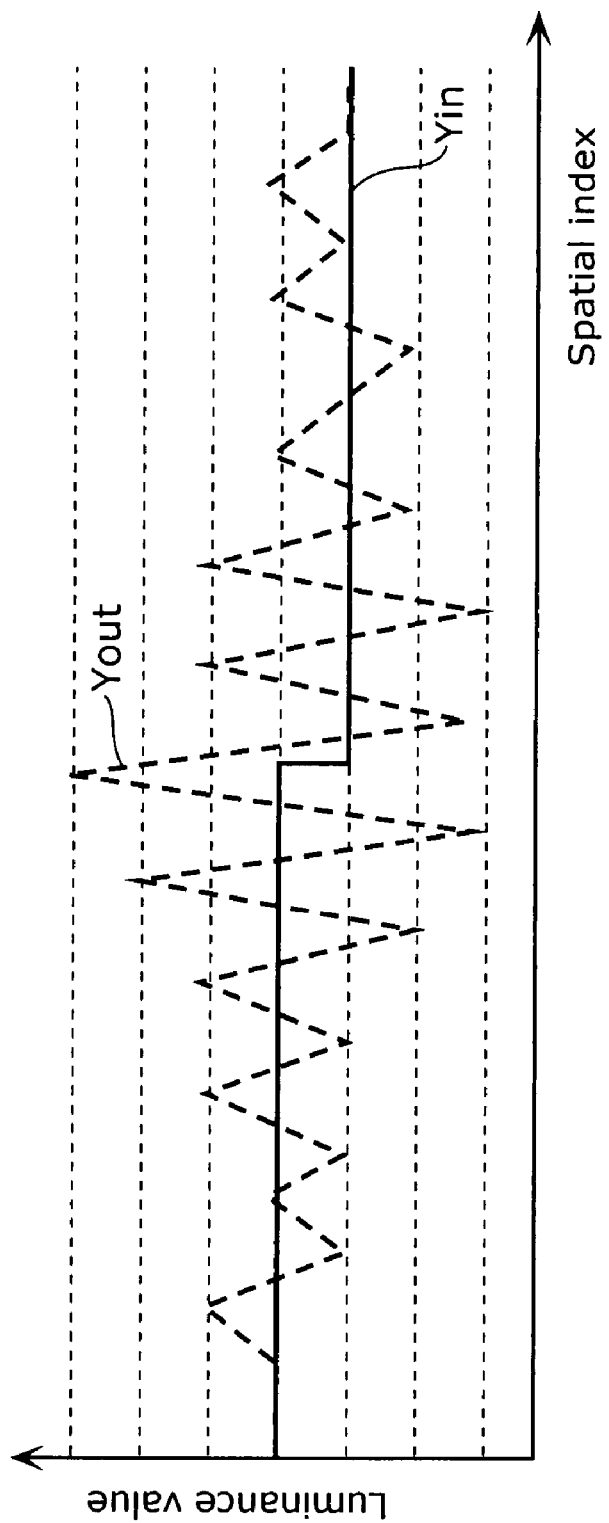
FIG. 2C shows an example of an original image and an image to which a masking signal has been added.

An image signal Yin (i, j) which is an integer value is inputted into the input unit 100. In a portion of the image signal Yin (i, j) where contouring or block distortion is obvious, a luminance level difference appears as shown by a solid line in FIG. 2A. By adding the random numbers shown in FIG. 2B to such portion, it is possible to make it difficult to perceive the contouring and the block distortion. Note that noise is increased when a random number is added to a flat portion. FIG. 2C shows a diagram of a signal obtained by adding random numbers. As described below, by controlling an amplitude of a random number to be added based on a difference $\delta_1$ obtained by subtracting, from the input image signal Yin (i, j), an image signal Ylp (i, j) that has been processed using a low pass filter and that is shown by a dotted line in FIG. 2A, it is possible to prevent the increasing noise in a flat portion, while making it difficult to perceive the contouring and the block distortion.

The masking signal generating unit 101 is a processing unit which generates a masking signal including a random number, and includes a level difference processing unit 105, a difference calculating unit 106, a gradation conversion unit 107, a random number setting unit 108, a rounding unit 109, and a delaying unit 110.

The level difference processing unit 105 is a processing unit which smoothes a level difference between pixel values of pixels of an inputted image signal. The level difference processing unit 105 smoothes a level difference included in the image signal Yin (i, j) which is shown in FIG. 2A, and outputs the image signal Ylp (i, j). For example, the level difference processing unit 105 processes an input image using a low pass filter one dimensionally or two dimensionally, and outputs the image signal Ylp (i, j) having higher bit precision than the input image signal Yin (i, j). In the following description, an extended bit is used as a fractional bit for the sake of convenience. As an embodiment of the low pass filter processing, for example, there is a method of using a one-dimensional N-tapped filter vertically and horizontally.

Furthermore, the level difference processing unit 105 may perform a level difference processing using an epsilon filter (referred to as ε filter) which eliminates noise having a small amplitude which is superimposed on a signal that greatly varies. Assuming that an n-th element of a signal X is expressed as X(n), in the case where the ε filter is a (2N+1) tapped one-dimensional filter, a signal Z(n) obtained by applying the ε filter to an image signal Y(n) is expressed as follows:

$$Z(n) = \sum_{k=-N}^{N} a(n) \cdot W(n-k)$$

Note that a coefficient a(n) satisfies the following equation:

$$\sum_{k=-N}^{N} a(k) = 1$$

When $|Y(n)-Y(n-k)| \leq \epsilon$, $W(n-k) = Y(n-k)$, and when $|Y(n)-Y(n-k)| > \epsilon$, $W(n-k) = Y(n)$.

The ε filter compares, with a predetermined threshold value ε, $|x(n)-x(n-k)|$ which is an absolute value of a difference between a pixel value x(n) of a center pixel p(n) in the filter processing and a pixel value x(n-k) of a pixel p(n-k). As a result, an image is processed using the low pass filter without using pixels whose differences with the center pixel value are larger than the threshold value ε. Thus, it is possible to smooth a level difference having a small amplitude while keeping the seep edge.

Furthermore, the level difference processing unit 105 may perform an appropriate deblocking process (a process for eliminating block distortion).

The delaying unit 110 delays the input image signal Yin (i, j) by a process delay occurring in the level difference processing unit 105, and outputs the signal having the delay to the difference calculating unit 106.

The difference calculating unit 106 is a processing unit which calculates a difference between an inputted image and an image processed by the level difference processing unit 105. The difference calculating unit 106 subtracts, from the input image signal Yin (i, j) which is inputted by the input unit 100 and is a integer value, the image signal Ylp (i, j) which is more precise in bits than the input image signal Yin (i, j) and is inputted by the level difference processing unit 105, and outputs the difference $\delta_1$ between the Yin (i, j) and Ylp (i, j). Since an absolute value of the difference $\delta_1$ becomes large at a portion where there is a level difference between luminance of pixels, it is possible to detect a portion where there is the contouring or block distortion.

Figure 3A:
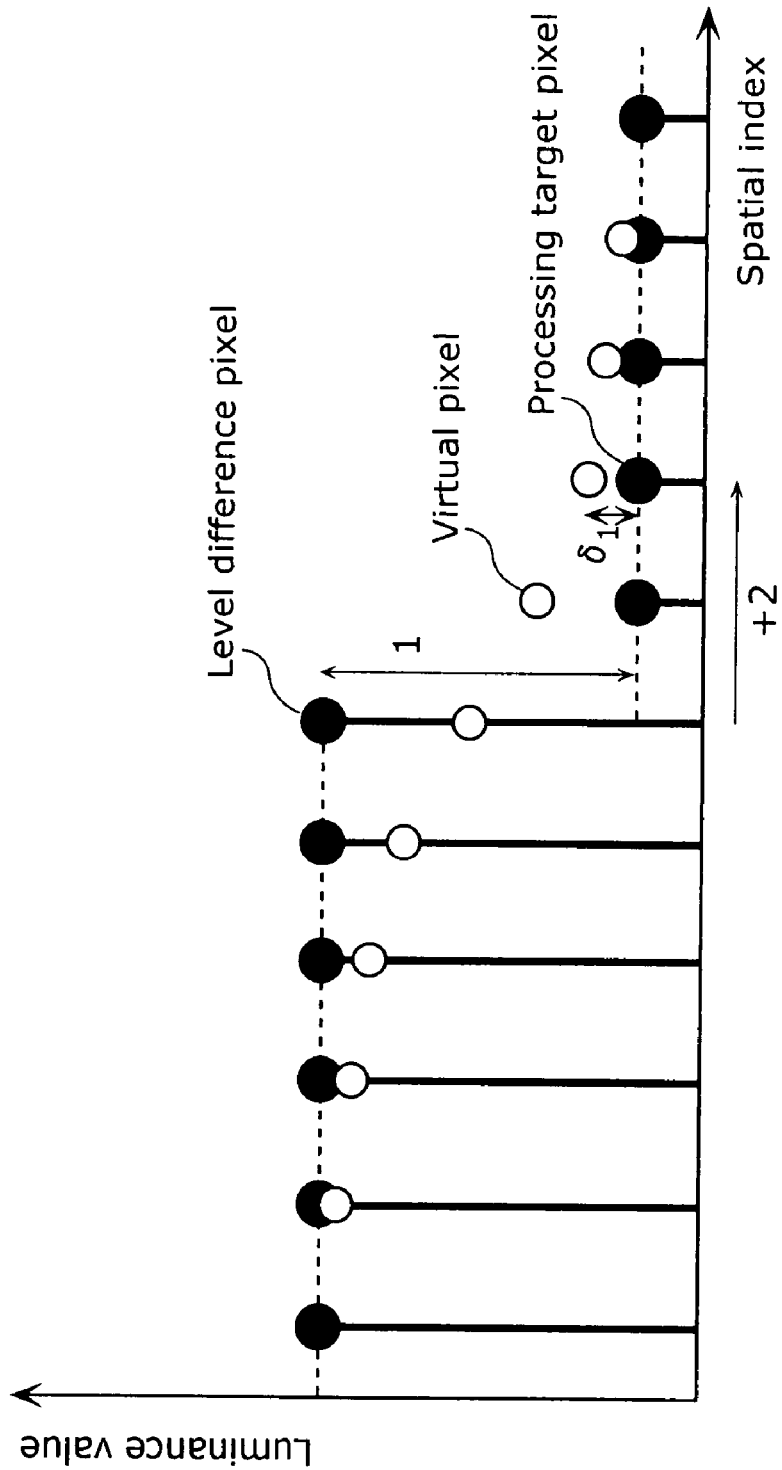
FIG. 3A shows an example of calculating a difference using virtual pixels.

Note the difference $\delta_1$ between the input image and the image after low pass filter processing is calculated by adding the level difference processing unit 105, the delaying unit 110, and the difference calculating unit 106 to the aforementioned configuration. However, these units are not indispensable. A predetermined value may be used as the difference $\delta_1$ between the pixels, depending on a spatial distance between a processing target pixel and a spatial level difference pixel and luminance values of these pixels, assuming that a level difference pixel is a pixel in which luminance level difference occurs. For example, as shown in FIG. 3A, virtual pixels represented by white circles are set for 9 pixels that surrounds a level difference pixel including the level difference pixel with respect to input images represented by black circles, and a difference between each of the white and black circles is assumed to be $\delta_1$. The virtual pixel is calculated based on a difference between luminance values of a level difference pixel and a processing target pixel and based on a spatial distance between the level difference pixel and the processing target pixel. For example, as shown in FIG. 3A, a virtual pixel is set, by referring to a table as shown in FIG. 3B, for a processing target pixel located two pixels to the right with respect to the level difference pixel having a luminance level difference 1. Herein, based on the table indicating that the level difference is 1 and the distance is +2, the virtual pixel is obtained by adding 0.25 to a luminance value of the processing target pixel. FIG. 3B is a table showing values for calculating a virtual pixel for a processing target pixel. In other words, FIG. 3B is a table showing the difference $\delta_1$. As such, by storing, in advance, the difference $\delta_1$ based on a level difference and a distance, it is possible to reduce unnecessary processing in amount.

Figure 4C:
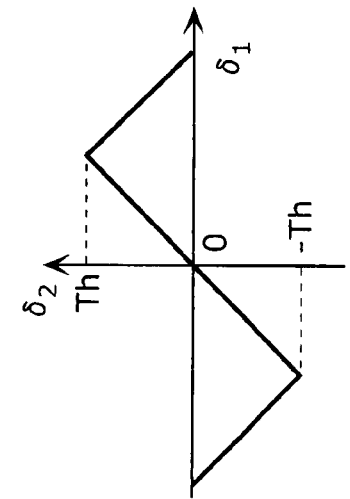
FIG. 4C shows an example of gradation conversion performed by the gradation conversion unit 107.
Figure 4B:
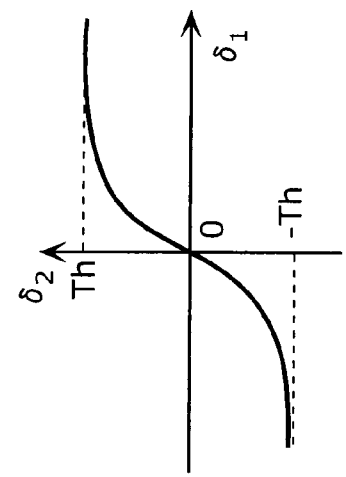
FIG. 4B shows an example of gradation conversion performed by the gradation conversion unit 107.
Figure 4E:
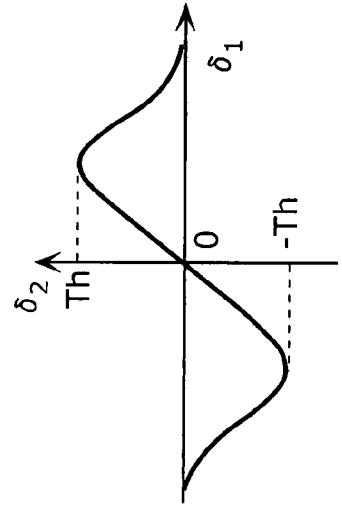
FIG. 4E shows an example of gradation conversion performed by the gradation conversion unit 107.
Figure 4A:
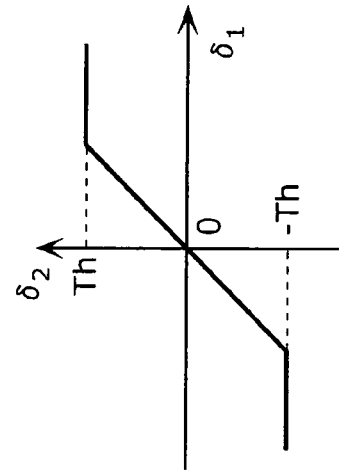
FIG. 4A shows an example of gradation conversion performed by the gradation conversion unit 107.
Figure 4D:
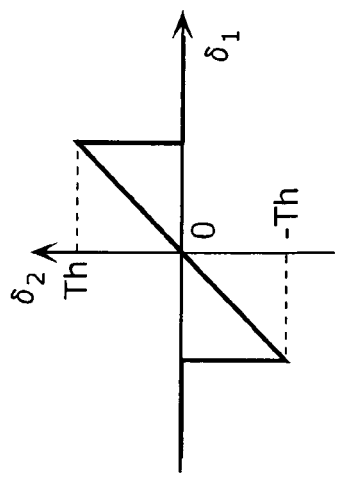
FIG. 4D shows an example of gradation conversion performed by the gradation conversion unit 107.

The gradation conversion unit 107 sends, to the random number setting unit 108, a signal $\delta_2$ which is obtained by performing gradation conversion on the difference $\delta_1$ which is inputted from the difference calculating unit 106. The signal $\delta_2$ is used for controlling an amplitude of a random number. As the value of the signal $\delta_2$ decreases, an amplitude of a random number to be added to an image decreases. On the contrary, as the value of the signal $\delta_2$ increases, an amplitude of a random number increases. The gradation conversion unit 107 prevents adding of a random number having an excessive amplitude by performing gradation conversion so as to fall $\delta_2$ to be outputted within a fixed range, regardless of how large the difference $\delta_1$ is. For example, as shown in FIG. 4A, the gradation conversion is performed so that $\delta_2$ becomes a predetermined value when $\delta_1$ is equal to or larger than a threshold value. Alternatively, as shown in FIG. 4B, the gradation conversion is performed so that $\delta_2$ approaches a predetermined value, as $\delta_1$ increases. The contouring appears, even when an absolute value of the difference $\delta_1$ is 1. When the absolute value of the difference $\delta_1$ is large, in most cases, the difference $\delta_1$ represents an edge component of an image Y (i, j), not the contouring or block distortion. Thus, as shown in FIGS. 4C to 4E, when the absolute value of the difference $\delta_1$ is large, it is possible to prevent addition of a random number to a portion where a luminance level difference is not caused by the contouring or block distortion, by making the output $\delta_2$ smaller or 0.

The random number setting unit 108 is a processing unit that sets a smaller amplitude, as the difference calculated by the difference calculating unit 106 approaches a predetermined value, and that creates a random number having the set amplitude. Furthermore, the random number setting unit 108 includes a random number amplitude setting unit 111, a random number creating unit 112, and a multiplying unit 113.

Figure 5:
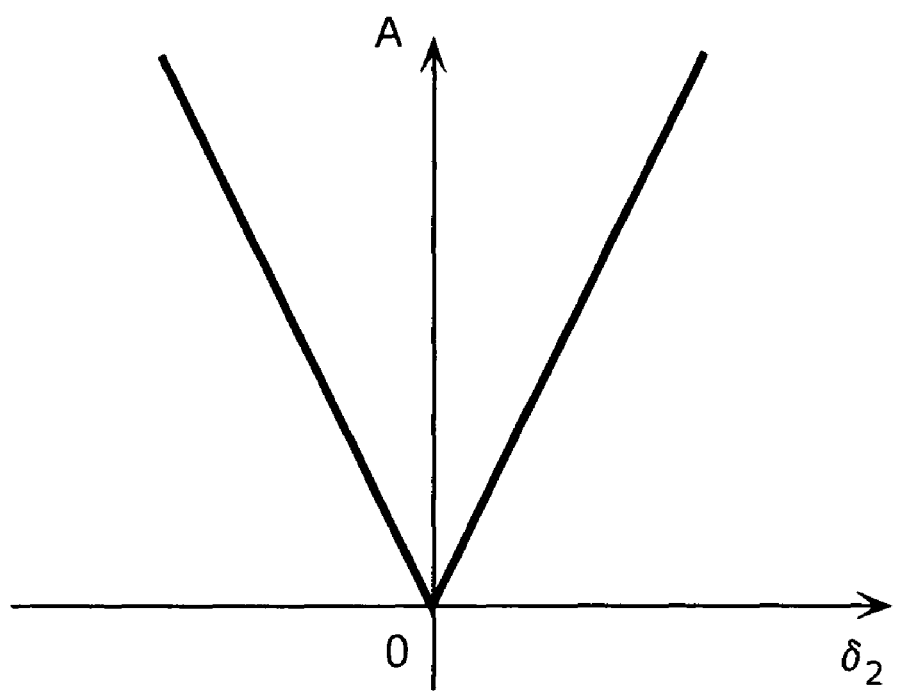
FIG. 5 shows an amplitude setting example in the random number amplitude setting unit 111.

The random number amplitude setting unit 111 sets a signal A which controls an amplitude of a random number to be added to an image using the signal $\delta_2$ in which the gradation conversion on the difference $\delta_1$ has been performed, and outputs the resulting signal A to the multiplying unit 113. FIG. 5 is a graph showing an example of a relationship between an input $\delta_2$ and an output A in the random number amplitude setting unit 111. In a portion of the graph where an absolute value of the input $\delta_2$ is large, an amplitude controlling signal A for a random number is a large value, and in a portion where the absolute value of the input $\delta_2$ is small, the amplitude controlling signal A of the random number is a small value. Since the absolute value of $\delta_2$ becomes small in a flat portion of an image, with the aforementioned configuration, it is possible to prevent addition of a random number having a large amplitude, in a visually obvious flat portion where a random number is added. Thus, there is an advantage of suppressing unnecessary noise caused by adding a random number signal.

The random number creating unit 112 creates a random number signal r with fractional precision, and outputs the resulting signal r to the multiplying unit 13. Note $-r_{th} \leq r \leq r_{th}$, for example, $r_{th}=1$.

The multiplying unit 113 calculates a signal $S=A \times r$ in which the aforementioned random number signal r is multiplied by an amplitude control signal A of the random number inputted from the random number amplitude setting unit 111, and outputs the signal S.

Note that the multiplying unit 113 is not indispensable, and the random number creating unit 112 may directly create a random number having the amplitude A by directly inputting, in the random number creating unit 112, the amplitude control signal A having the random number set by the random number amplitude setting unit 111.

The rounding unit 109 rounds, to an integer value, the signal S which is inputted from the random number setting unit 108, and outputs a masking signal M.

The masking signal adding unit 102 adds a masking signal M inputted from the masking signal generating unit 101 to a signal in which the input image signal Yin (i, j) has delayed in the delaying unit 103 by a processing delay equivalent to a delay occurring at the masking signal generating unit 101, and outputs an output image signal Yout (i, j) to the output unit 104.

Figure 6:
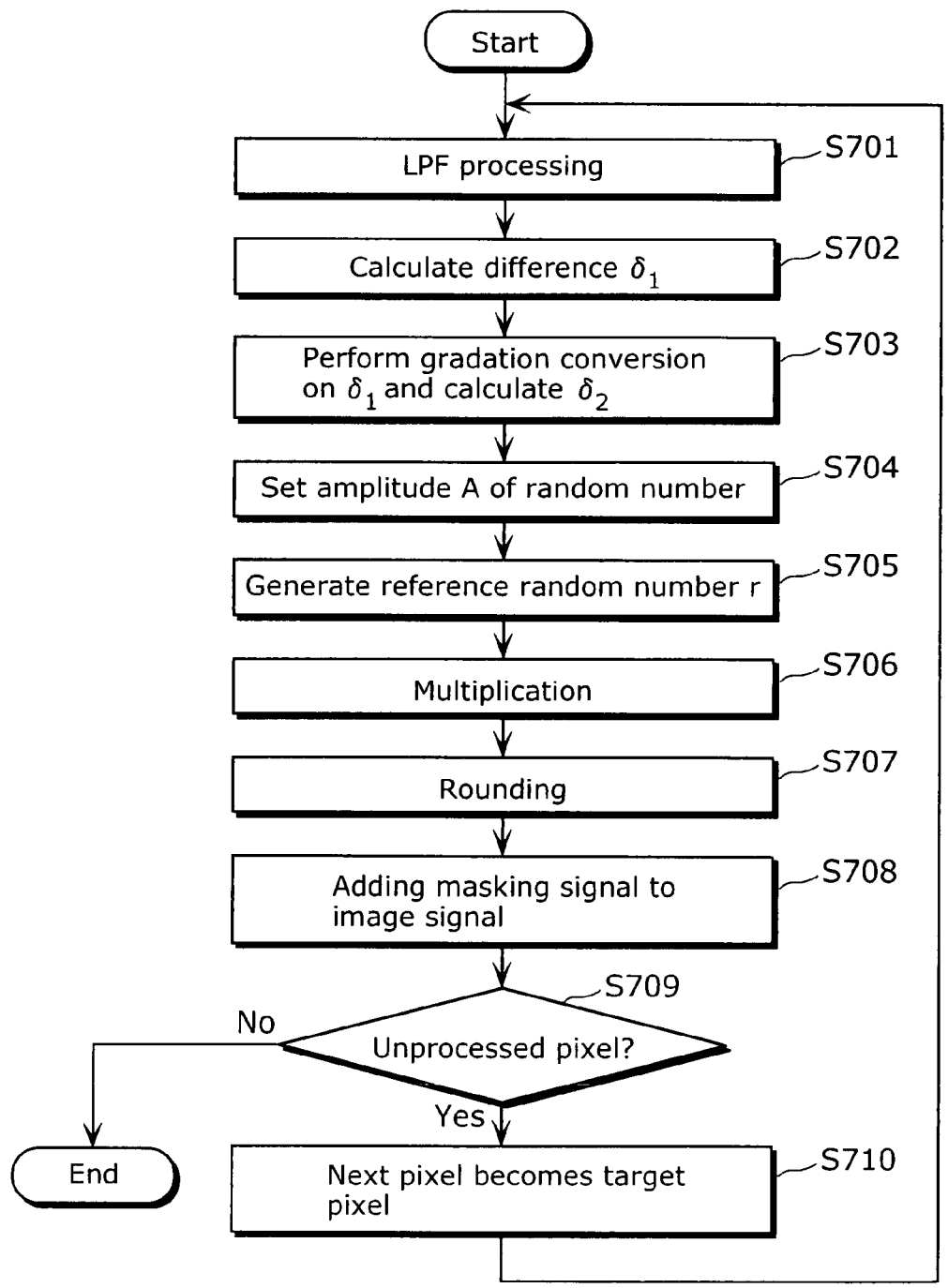
FIG. 6 is a flowchart showing the operations performed in the first embodiment of the present invention.

FIG. 6 is a flowchart showing an image processing method of the first embodiment.

The level difference processing unit 105 processes surrounding pixels Yin (i, j) with respect to a target pixel which is a level difference pixel, using the low pass filter, and calculates the Ylp (i, j) (S701). The difference calculating unit 106 calculates the difference $\delta_1$ between the pixel value Yin (i, j) of the input image and the Ylp (i, j) of a pixel value calculated after the low pass filter processing (S702). The gradation conversion unit 107 performs gradation conversion on the difference $\delta_1$, and calculates the converted difference $\delta_2$ (S703).

The random number amplitude setting unit 111 sets an amplitude A of a random number based on the $\delta_2$ (S704). Furthermore, the random number creating unit 112 creates the random number r to be a reference value (S705). The multiplying unit 113 calculates the signal $S=A \times r$ in which the amplitude A inputted from the random number amplitude setting unit 111 is multiplied by a reference random number r inputted from the random number creating unit 112 (S706). The rounding unit 109 calculates the masking signal M by rounding, to an integer value, the signal S having a fractional portion (S707). The masking signal adding unit 102 adds the masking signal M to the pixel value Yin (i, j) of the input image (S708).

Then, it is judged whether or not the aforementioned processing is performed in each of the pixels (S709). When there is still an unprocessed pixel (Yes at S709), the next pixel becomes a target pixel, and the same processing from the low pass filter processing (S701) to the masking signal adding processing (S709) is repeated. When there is no unprocessed pixel (No at S709), the image processing ends.

With the aforementioned configuration, the image processing apparatus according to the first embodiment can reduce energy of the masking signal M to be added to an image, as a target portion on which the image processing is performed is shifted from a portion where a luminance level difference exists to a flat portion. Thus, it is possible to suppress the increase of unnecessary noise, while making it difficult to perceive the contouring and the block distortion, using the masking effects with the addition of random numbers. Consequently, the subjective picture quality can be improved.

Second Embodiment

Figure 7:
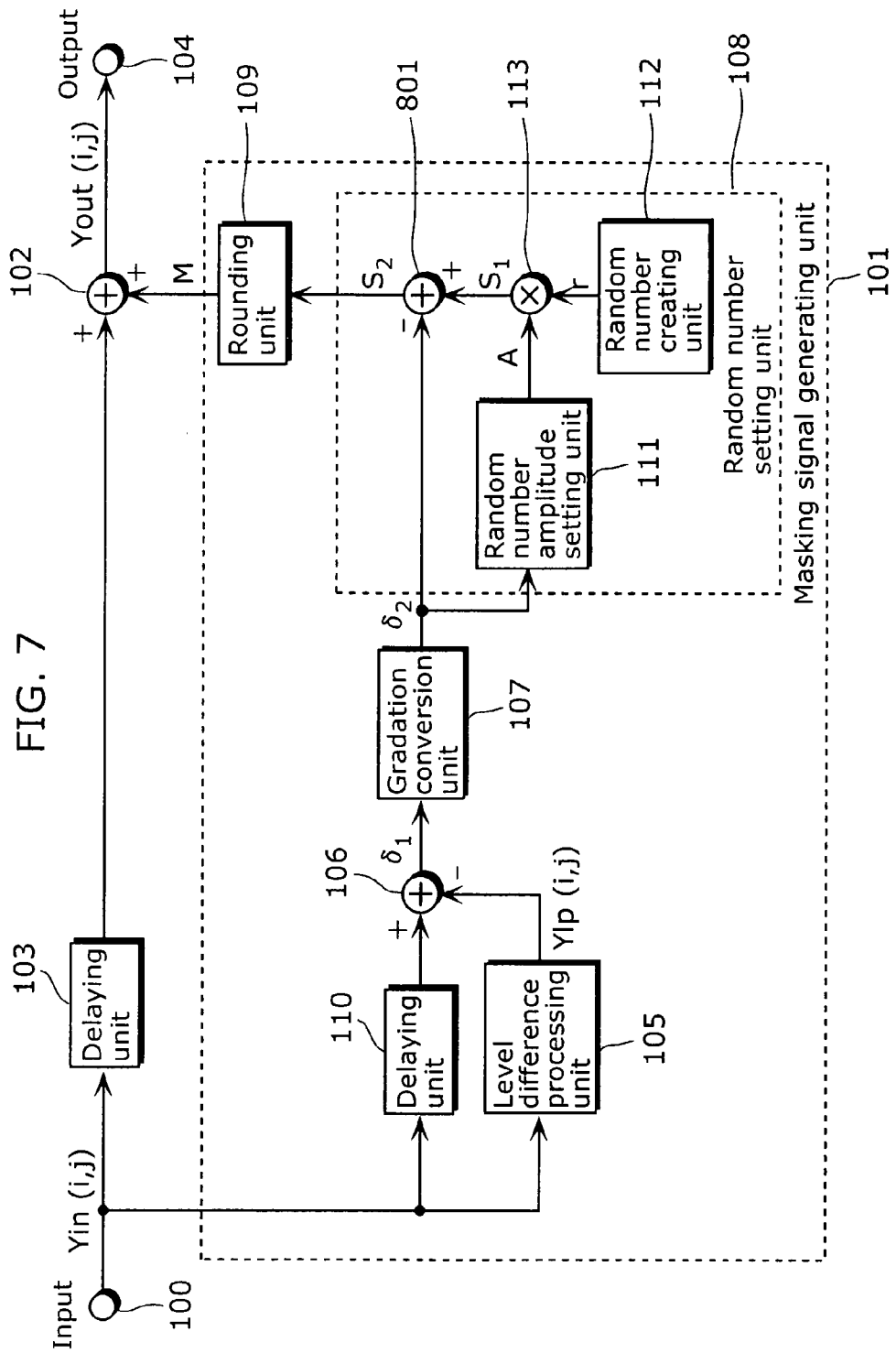
FIG. 7 schematically shows an image processing apparatus according to the second embodiment of the present invention.

FIG. 7 is a block diagram showing an embodiment of the image processing apparatus and the image processing method of the present invention, when a luminance level difference caused by the contouring or block distortion is visually smoothed. The configuration of the diagram differs in that a random number expected value setting unit 801 is newly added, compared to the configuration in FIG. 1. The description similar to FIG. 1 is omitted, and different points are mainly described hereinafter.

Compared to the configuration in FIG. 1, an expected value of the created masking signal M can be controlled by adding the random number expected value setting unit 801 to the masking signal generating unit 101 in the configuration of FIG. 7. The random number expected value setting unit 801 outputs, to the rounding unit 109, a signal $S_2$ obtained by subtracting, from a signal $S_1$ inputted from the multiplying unit 113, a signal $\delta_2$ inputted from the gradation conversion unit 107.

With this, it becomes possible to represent a resolution with fractional precision in the image signal Yout (i, j) obtained by adding the masking signal. For example, assuming that the signal $S_1$ outputted from the multiplying unit 113 is a random number having the amplitude "2" and the expected value "0" and that the signal $\delta_2$ outputted through the gradation conversion is a value "0.5", the signal $S_2$ after the subtraction which is outputted from the random number expected value setting unit 801 is a random number having the amplitude "2" and the expected value "−0.5". Therefore, the pixel value of the image signal Yout (i, j) obtained by adding a signal M to the image signal Yin (i, j) in the masking signal adding unit 102 is equivalent to a pixel value in which the gradation is statistically lowered by 0.5.

Figure 8:
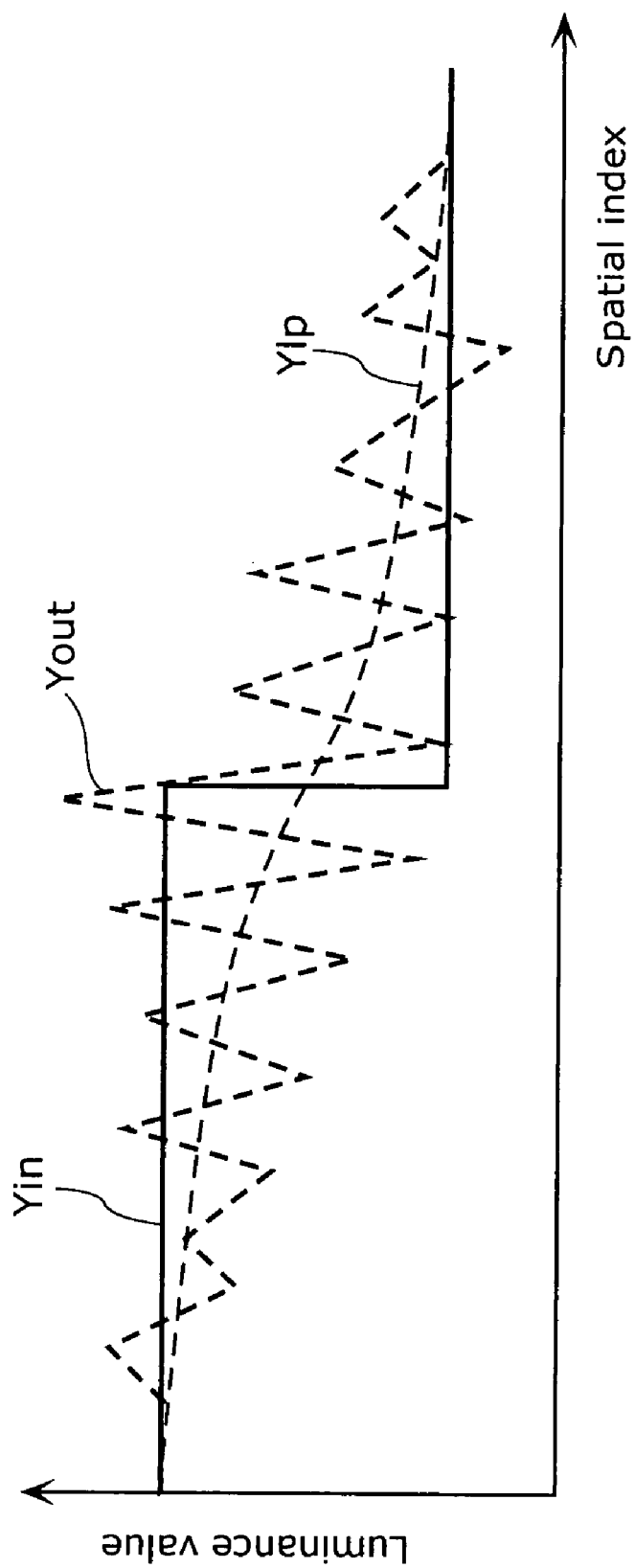
FIG. 8 shows an example of an original image and an image to which a masking signal has been added.

FIG. 8 is a diagram showing an example of an output signal Yout (i, j) in which the masking signal M having an controlled expected value is added to the input signal (i, j). When the level difference processing unit 105 smoothes the input image signal Yin (i, j), it is possible to obtain a signal Ylp (i, j) after the smoothing. After calculating the difference $\delta_1$, the random number amplitude setting unit 111 sets an amplitude A according to the graph shown in FIG. 5. As mentioned above, when the random number expected value setting unit 801 subtracts $\delta_2$ from the random number signal $S_1$, the signal Yout (i, j) obtained by adding the masking signal M is as shown in FIG. 8. An expected value of the signal Yout (i, j) that is shown in FIG. 8 corresponds to the signal Ylp (i, j) after the level difference processing.

Figure 9A:
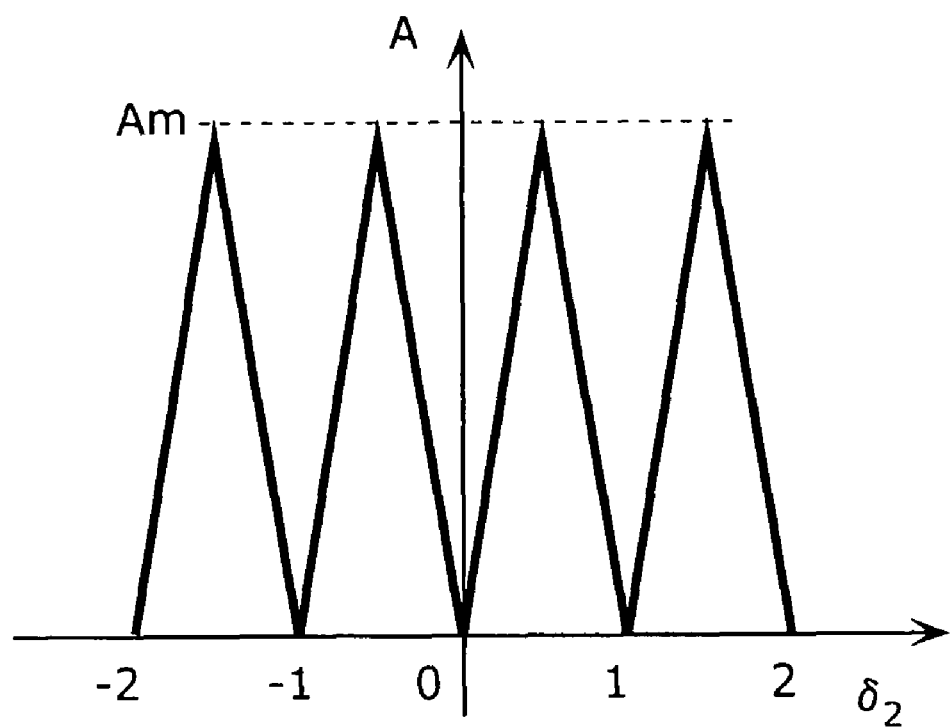
FIG. 9A shows an example of an amplitude setting in the random number amplitude setting unit 111.
Figures 9B, 9C:
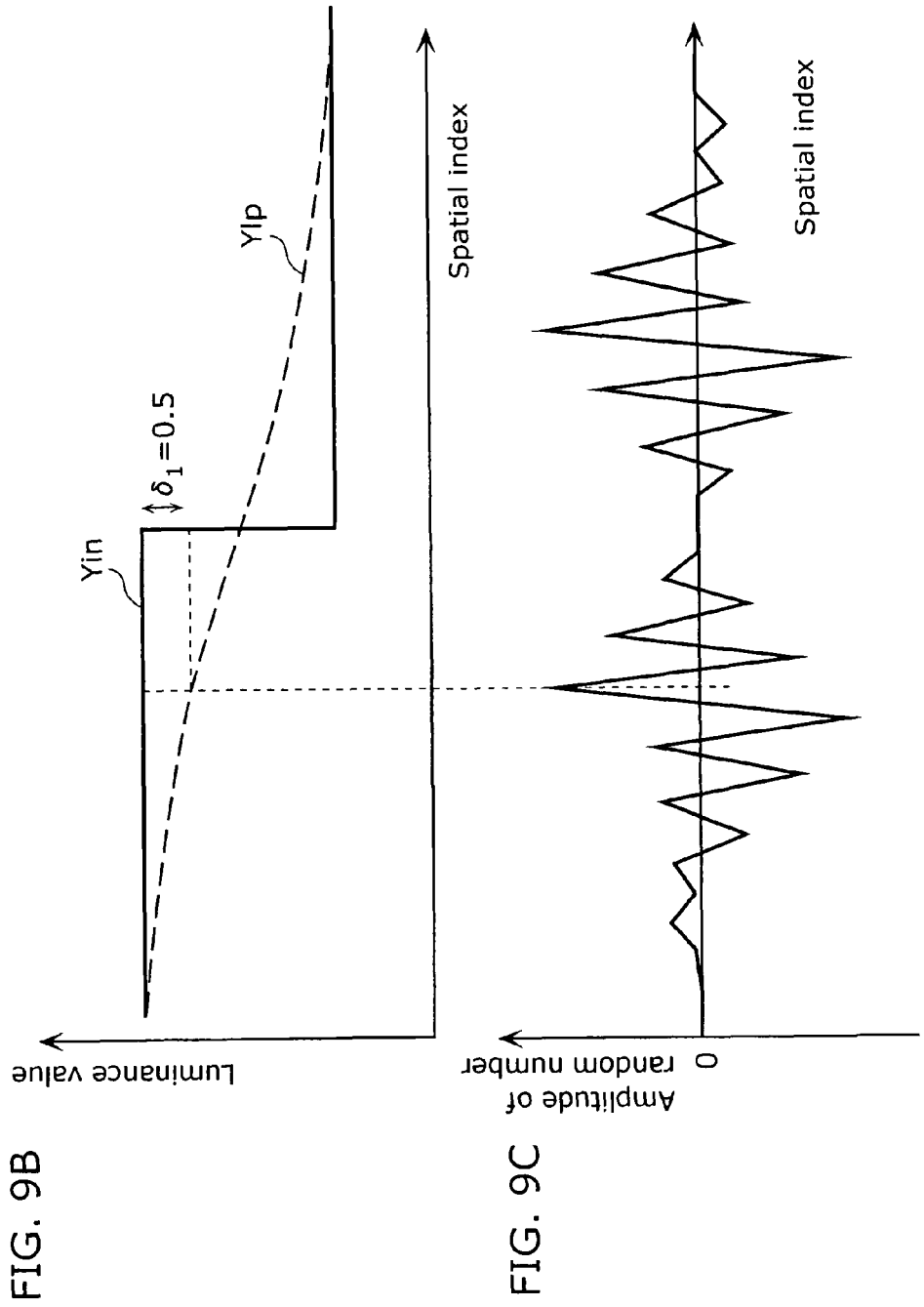
FIG. 9B shows an example of a difference $\delta_1$ between an original image and an image which has been processed using a low pass filter.
FIG. 9C shows an example of a signal $S_1$ outputted from the multiplying unit 113.
Figure 9D:
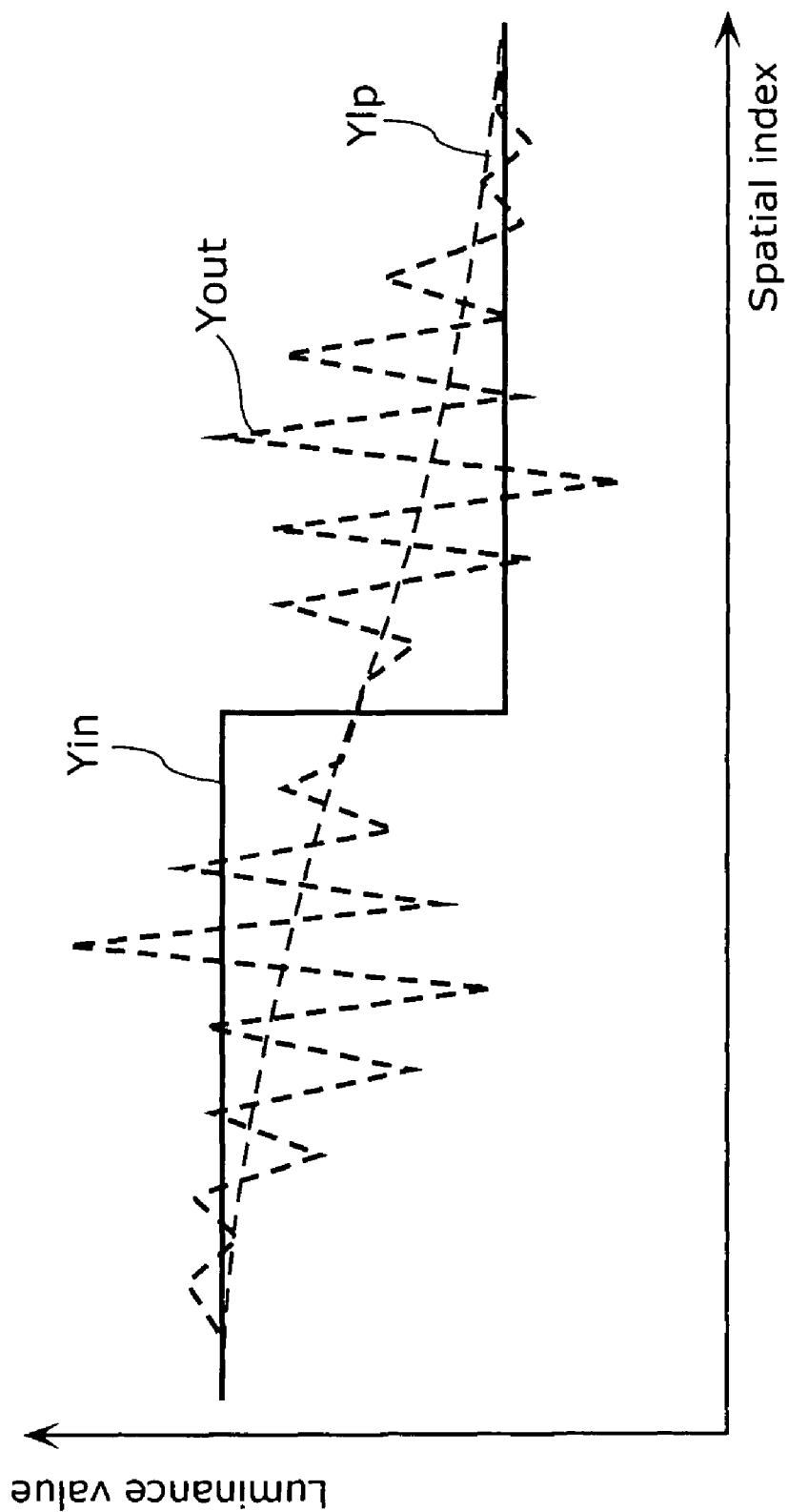
FIG. 9D shows an example of the original image and an image to which a masking signal has been added.

Note that the random number amplitude setting unit 111 may control an amplitude of the random numbers shown in FIG. 9A. FIG. 9A is a graph showing another example of a relationship between an input $\delta_2$ and an output A to and from the random number amplitude setting unit 111. Depending on a fractional portion of the input $\delta_2$, an amplitude control signal of a random number is determined. As the fractional portion of the input $\delta_2$ increases over 0, the amplitude A increases. In the case where the fractional portion of $\delta_2$ is 0.5, the amplitude A becomes maximal (A=Am), and as the fractional portion $\delta_2$ increases over 0.5, the amplitude A decreases. In other words, as $\delta_2$ approaches an integer value, the amplitude A decreases. For example, in the case of $\delta_2$=1.0 which is an integer value, the amplitude of a random number becomes 0. FIG. 9B is a diagram showing an example of a level difference of the input signal (i, j). The luminance level difference is 2, and the level difference processing unit 105 outputs the signal Ylp (i, j) after the smoothing which is expressed by a dotted line. FIG. 9C is a diagram showing the signal $S_1$ outputted from the multiplying unit 113, when the amplitude control shown in FIG. 9A is performed. The expected value of the signal $S_2$ is controlled in the random number expected value setting unit 801 by subtracting, from the signal $S_1$ shown in FIG. 9C, the signal $\delta_2$ inputted from the gradation conversion unit 107. FIG. 9D shows the signal Yout (i, j) obtained by adding the signal $S_2$ to the signal Yin (i, j) shown in FIG. 9B. By controlling an amplitude of a random number as described above, it is possible to realize statistical gradation by adding a random number, using the gradation technique with fractional precision, while reducing the increase of noise caused by adding of a random number, using the gradation technique with integer precision (where a level difference is expressed by an integer).

Figure 10A:
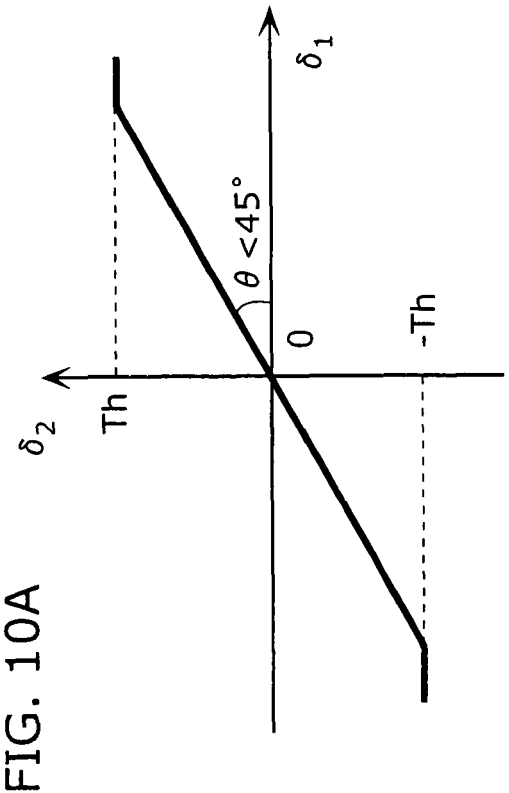
FIG. 10A shows an example of gradation conversion performed by the gradation conversion unit 107.
Figure 10B:
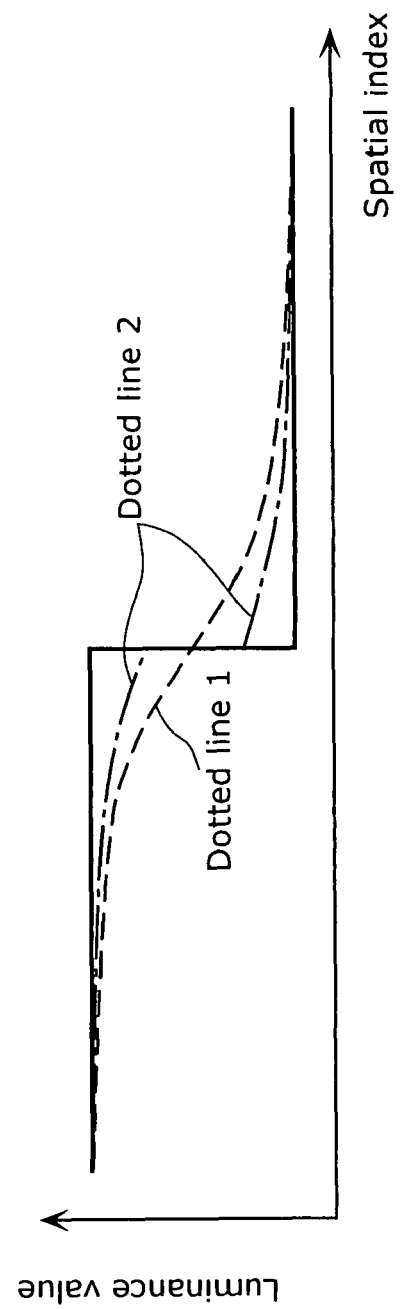
FIG. 10B shows statistical gradation after a masking signal is added.

The gradation conversion unit 107 having the configuration of FIG. 7 performs gradation conversion on the difference $\delta_1$ inputted from the difference calculating unit 106 so as to fall $\delta_2$ within a certain range, and outputs the resulting signal $\delta_2$ to the random number expected value setting unit 801 and the random number amplitude setting unit 111. In the relationship between the input $\delta_1$ and the output $\delta_2$ in the gradation conversion unit 107, for example, the slope of the graph representing the relationship between the input $\delta_1$ and the output $\delta_2$ may be less than 45° as shown in FIG. 10A in the second embodiment. With this, a statistical value of a pixel value in the image signal Yout (i, j) to which a masking signal is added can be a value that reduces image blurring using the low pass filter processing, as shown by a dotted line 2 in FIG. 10B. Note that a solid line in the diagram represents the input image signal Yin (i, j), and a dotted line 1 represents the image signal Ylp (i, j) obtained by the low pass filter processing. By setting an appropriate value for the slope of the graph representing the relationship between the input $\delta_1$ and the output $\delta_2$, it is possible to prevent excessive image blurring and to reduce a luminance level difference to an extent that the level difference becomes visually less obvious, by adding a masking signal.

Note that the multiplying unit 113 and the random number expected value setting unit 801 are not indispensable, and it is possible to directly create a random number having the amplitude A and the expected value $\delta_2$ and to output the random number to the rounding unit 109, by directly inputting, in the random number creating unit 112, $\delta_2$ outputted from the gradation conversion unit 107 and the amplitude A outputted from the random number amplitude setting unit 111.

Note that in the case where information regarding a gradation characteristic of a display unit (not illustrated) that follows the output unit 104 is available, an expected value and an amplitude of a random number may be set based on the aforementioned information. For example, according to information that is stored in the aforementioned display unit in advance and indicates that there is a large luminance level difference in a specific gradation and the contouring easily occurs, the display unit inputs information for identifying the gradation that easily causes contouring in the masking signal generating unit 101 so as to add a masking signal only in the gradation. With this, it is possible to prevent the increase of noise in the gradation in which the contouring hardly occurs.

With the aforementioned configuration, since it becomes possible to visually smooth the level difference in luminance by controlling an expected value of a masking signal, the contouring or block distortion can be further reduced, compared to the first embodiment.

Third Embodiment

Figure 11:
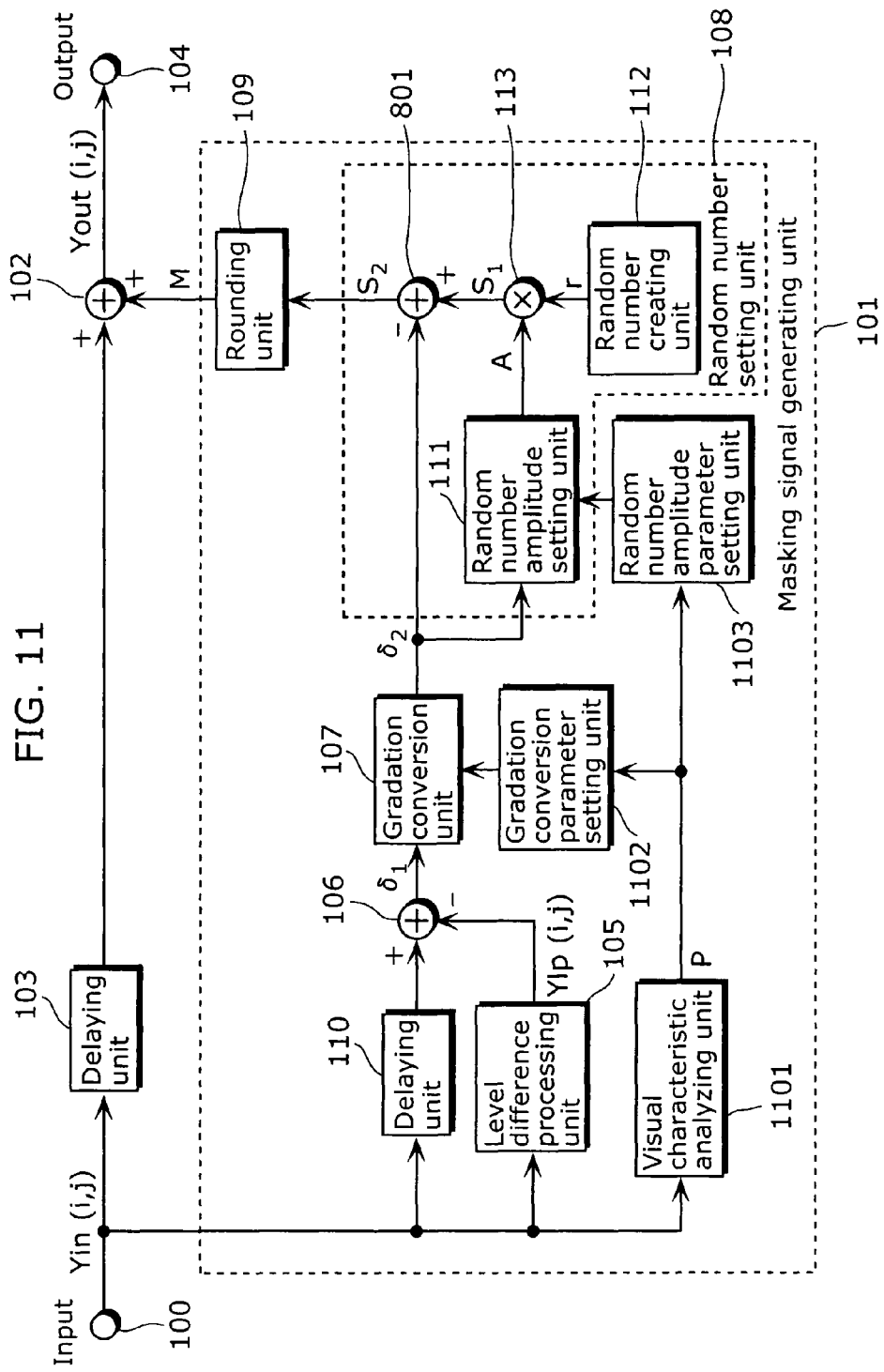
FIG. 11 schematically shows an image processing apparatus according to the third embodiment of the present invention.

FIG. 11 is a block diagram showing an embodiment of the image processing apparatus and the image processing method, when the contouring or block distortion becomes visually less obvious while preventing an adverse effect, such as image blurring and increase of unnecessary noise, by controlling a masking signal based on local visual characteristics of an image. The configuration of the diagram differs from the configuration shown in FIG. 7 in that a visual characteristic analyzing unit 1101, a gradation conversion parameter setting unit 1102, and a random number amplitude parameter setting unit 1103 are newly added. The description similar to FIG. 7 is omitted, and different points are mainly described hereinafter.

The visual characteristic analyzing unit 1101 outputs a visual characteristic analytical parameter P that controls a parameter for gradation conversion and for controlling an amplitude of a random number by analyzing local characteristics of the input image signal Yin (i, j), for example, a spatial activity and a motion amount of the image.

Figure 12:
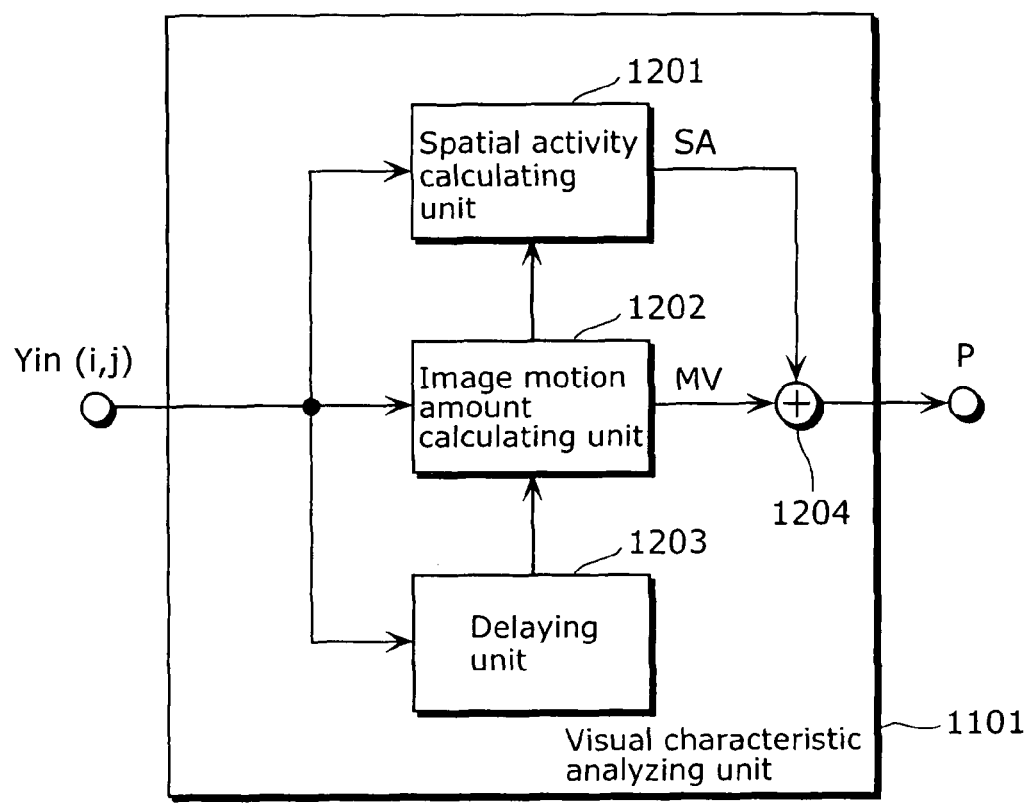
FIG. 12 schematically shows the visual characteristic analyzing unit 1101.

FIG. 12 is a diagram showing an embodiment of the visual characteristic analyzing unit 1101. In the diagram, the visual characteristic analyzing unit 1101 includes a spatial activity calculating unit 1201, an image motion amount calculating unit 1202, a delaying unit 1203, and an adding unit 1204. The spatial activity calculating unit 1201 calculates a local spatial activity SA of an image with respect to processing target pixels. A fact that the spatial activity is high indicates that SA has a large value, and that the higher the value of the SA is, the less smooth the local area is. When a local area is smooth, the contouring becomes obvious. Thus, it is necessary to add the masking signal M. Note as one of the specific calculation methods, for example, $SA=C_1 \times \sigma$ is calculated using the variance $\sigma$ of a 5×5 area with respect to a processing target pixel. Note that $C_1$ is a constant.

The image motion amount calculating unit 1202 calculates a motion amount mv of a local area using the input image signal Yin (i, j) and a previous frame image inputted from the delaying unit 1203, and outputs the signal $MV=C_2 \times |mv|$. Note that $C_2$ is a constant. When the motion amount mv is small, the contouring becomes obvious. Thus, it is necessary to add the masking signal M.

The adding unit 1204 calculates an adaptive parameter P=SA+MV, using the SA inputted from the spatial activity calculating unit 1201 and the MV inputted from the image motion amount calculating unit 1202, and outputs the parameter P.

The adaptive parameter P is a large value in an area where motion of a local area image with respect to a target point is large or an area where luminance variation is not smooth. In such an area, the contouring or block distortion is less obvious. On the other hand, in an area where a local area image is smooth and an area where the motion amount is small, the contouring or block distortion is obvious. Thus, an amplitude of a random number included in a masking signal is controlled so as to make the amplitude small when the adaptive parameter P is a large value, or so as to make the amplitude large when the adaptive parameter P is a small value. With the control, it becomes possible to add a masking signal only in an area where the contouring or block distortion is visually obvious. With this, it becomes possible to effectively reduce the contouring or block distortion while preventing an adverse effect, such as image blurring and increase of unnecessary noise.

The gradation conversion parameter setting unit 1102 sets a parameter for the gradation conversion performed at the gradation conversion unit 107, based on the visual characteristic analytical parameter P inputted from the visual characteristic analyzing unit 1101. For example, as the value P increases, the contouring and block distortion become visually obvious. Thus, in the graphs of FIGS. 4A to 4E showing the relationship between the input $\delta_1$ and the output $\delta_2$ of the gradation conversion unit 107, it is possible to reduce the image blurring caused by the addition of a masking signal, by reducing the slope of the graph when the value P is large. Furthermore, it is possible to set the slope for a threshold value Th in the diagram, based on the visual characteristic analytical parameter P. For example, when the value P is large, by decreasing the threshold value Th, it is possible to prevent the masking signal from being excessively added.

The random number amplitude parameter setting unit 1103 sets a parameter to be used in the random number amplitude setting unit 111, based on the visual characteristic analytical parameter P inputted from the visual characteristic analyzing unit 1101. For example, as the visual characteristic analytical parameter P decreases, the contouring or block distortion visually becomes obvious. Thus, in FIGS. 5 and 9A showing examples of random number amplitude setting, each of the slopes of the graphs is increased in inverse proportion to the value P. With this, it becomes possible to add a masking signal which is particularly intense in an area where the contouring or block distortion is visually obvious. Thus, noise is not excessively increased, and the contouring or block distortion can be less obvious.

With the aforementioned configuration, by calculating a visual characteristic analytical parameter P indicating visual obviousness of the contouring and block distortion for each local area, it is possible to effectively add a masking signal in an area where the contouring and block distortion are visually obvious, while preventing an adverse effect, such as image blurring and increase of unnecessary noise caused by adding an unnecessary masking signal in an area where the contouring and block distortion are visually less obvious. With this, it becomes possible to make the contouring and block distortion visually less obvious, and thus to improve subjective picture quality.

Although the embodiments of the image processing apparatus and the image processing method according to the present invention are described above, the present invention is not limited to the described embodiments. Unless otherwise various changes and modifications in the present description which are conceived by those skilled in the art depart from the scope of the present invention, such changes and modifications should be construed as being included therein.

For example, the present invention can be realized, not only as the aforementioned image processing apparatus and the image processing method, but also as a program causing a computer to execute steps of the image processing method of the present invention. Furthermore, it is possible to realize the present invention as a recording medium, such as a computer-readable CD-ROM in which the program is recorded, and as information indicating the program, data, or signals. Such program, information, data, and the signals may be distributed via a communication network, such as the Internet.

Furthermore, as specific embodiments of the image processing apparatus according to the present invention, an operation independent apparatus, a component of the apparatus, and an integrated circuit such as an LSI may be given.

INDUSTRIAL APPLICABILITY

Figure 13:
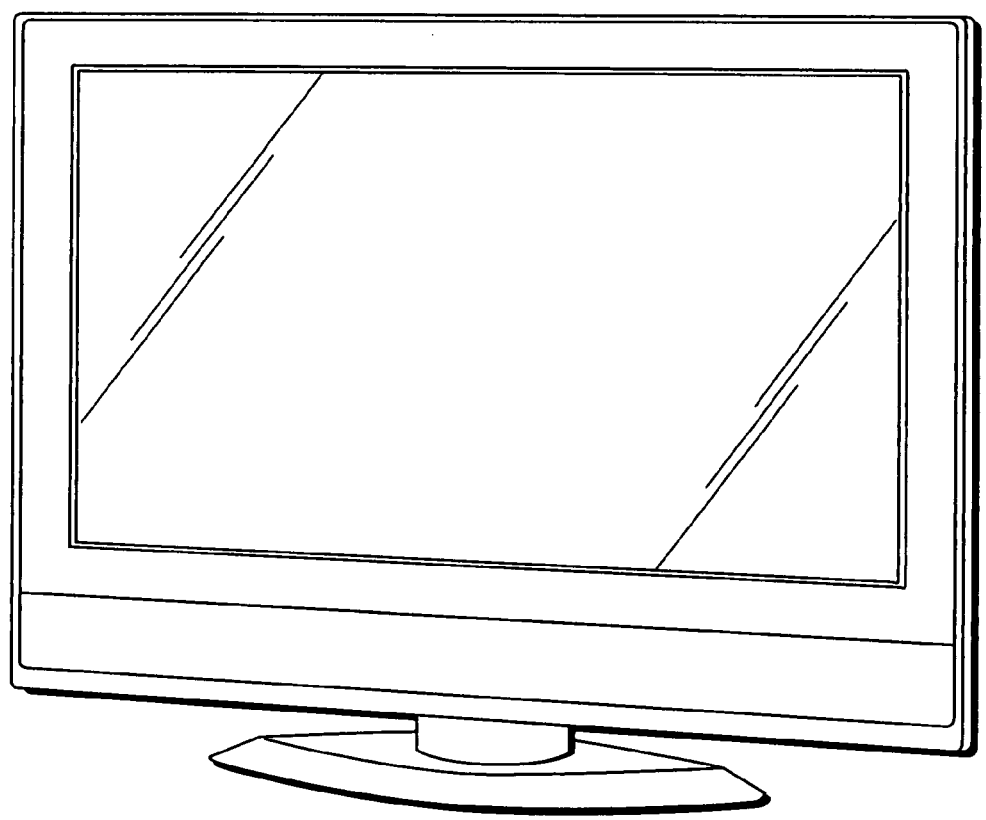
FIG. 13 is an outline view of a digital television using the image processing apparatus according to the present invention.

The image processing method and the image processing apparatus according to the present invention are the image processing method and the image processing apparatus that masks an input image by adding a random number. For example, the image processing apparatus is used as an image processing apparatus that is installed in a digital television shown in FIG. 13, a movie camera, a still camera, and the like.

What is claimed is:

1. An image processing apparatus that reduces distortion in an input image, said apparatus comprising:
   a masking signal generating unit operable to generate a masking signal for reducing the distortion; and
   a masking signal adding unit operable to add the masking signal to the input image,
   wherein said masking signal generating unit includes:
   a level difference processing unit operable to smooth a level difference between pixel values of pixels in the input image;
   a difference calculating unit operable to calculate a difference between the input image and an image which has been processed by said level difference processing unit; and
   a random number setting unit operable to set an amplitude, to create a random number having the set amplitude, and to generate, as the masking signal, a signal based on the created random number, the amplitude decreasing, as the difference approaches a predetermined value;
   wherein said masking signal generating unit further includes
   a gradation conversion unit operable to output a converted difference by converting gradation of the difference, such that an absolute value of the converted difference is equal to or less than a first threshold value, and
   said random number setting unit is operable to set an amplitude, and to create a random number having the set amplitude, the amplitude decreasing, as the converted difference approaches a predetermined value.

2. The image processing apparatus according to claim 1, wherein said random number setting unit is operable to set an expected value of the random number based on the difference calculated by said difference calculating unit, and to create the random number having the set expected value and the set amplitude.

3. The image processing apparatus according to claim 1, wherein said level difference processing unit is operable to smooth the level difference by processing the input image using a low-pass filter.

4. The image processing apparatus according to claim 1, wherein said level difference processing unit is operable to smooth the level difference by processing the input image using an epsilon filter.

5. The image processing apparatus according to claim 1, wherein said level difference processing unit is operable to calculate the level difference between the pixel values of the pixels, and to replace processing target pixels with virtual pixels, the processing target pixels including level difference pixels, the virtual pixels being calculated based on a distance between the level difference pixels and the processing target pixels and based on the level difference between the pixel values so as to smooth the level difference, the level difference pixels causing the level difference.

6. The image processing apparatus according to claim 1, wherein said random number setting unit is operable to set an amplitude, and to create a random number having the set amplitude, the amplitude decreasing, as an absolute value of the converted difference decreases.

7. The image processing apparatus according to claim 1, wherein the pixel values are integers, and
   said random number setting unit is operable to set an expected value of the random number based on the converted difference, to set an amplitude, and to create a random number having the set expected value and the set amplitude, the amplitude decreasing, as the converted difference approaches an integer value.

8. The image processing apparatus according to claim 1, wherein said gradation conversion unit is operable to output 0 as the converted difference, when the absolute value of the difference is larger than a second threshold value.

9. The image processing apparatus according to claim 1, wherein said gradation conversion unit is operable to output, as the converted difference, a value obtained by decreasing the absolute value of the difference at a fixed ratio.

10. The image processing apparatus according to claim 1, wherein said masking signal generating unit further includes
    a visual characteristic analyzing unit operable to calculate a visual characteristic analytical parameter by analyzing a human visual characteristic of the input image, and
    said random number setting unit is operable to set, based on the visual characteristic analytical parameter, the amplitude so that the masking signal is added only to a portion in which the distortion in the input image is obvious, and to create the random number having the set amplitude.

11. The image processing apparatus according to claim 10, wherein said visual characteristic analyzing unit includes
    a spatial activity analyzing unit operable to analyze a spatial activity of the input image, and
    said random number setting unit is operable to set the amplitude so that the amplitude decreases in a portion in which the spatial activity is high.

12. The image processing apparatus according to claim 10, wherein said visual characteristic analyzing unit includes
    a motion amount analyzing unit operable to analyze a motion amount of the input image, and
    said random number setting unit is operable to set the amplitude so that the amplitude increases in a portion in which the motion amount is small.

13. An image processing method for reducing distortion in an input image, said method comprising:
    a masking signal generating step of generating a masking signal for reducing the distortion; and
    a masking signal adding step of adding the masking signal to the input image,
    wherein said masking signal generating step includes:
    a level difference processing step of smoothing a level difference between pixel values of pixels in the input image;
    a difference calculating step of calculating a difference between the input image and an image which has been processed in said level difference processing step; and
    a random number setting step of setting an amplitude, creating a random number having the set amplitude, and generating, as the masking signal, a signal based on the created random number, the amplitude decreasing, as the difference approaches a predetermined value;
    wherein said masking signal generating step further includes
    a gradation conversion step to output a converted difference by converting gradation of the difference, such that an absolute value of the converted difference is equal to or less than a first threshold value, and said random number setting step to set an amplitude, and to create a random number having the set amplitude, the amplitude decreasing, as the converted difference approaches a predetermined value.

14. A non-transitory computer-readable medium having stored thereon a program for an image processing apparatus that reduces distortion in an input image, said program causing a computer to execute the steps included in the image processing method according to claim 13.

UNITED STATES PATENT AND TRADEMARK OFFICE
CERTIFICATE OF CORRECTION

| | | |
|---|---|---|
| PATENT NO. | : 7,916,967 B2 | Page 1 of 1 |
| APPLICATION NO. | : 11/826938 | |
| DATED | : March 29, 2011 | |
| INVENTOR(S) | : Kenji Takita et al. | |

It is certified that error appears in the above-identified patent and that said Letters Patent is hereby corrected as shown below:

On the Title Page

Item (57) Abstract, line 15, "a is random number" should read --a random number--.

Signed and Sealed this
Fifth Day of July, 2011

David J. Kappos
*Director of the United States Patent and Trademark Office*